April 21, 1970  B. HERRMANN ET AL  3,507,113
DIFFERENTIAL FOR TWO-SHAFT GAS TURBINE
Filed May 15, 1968
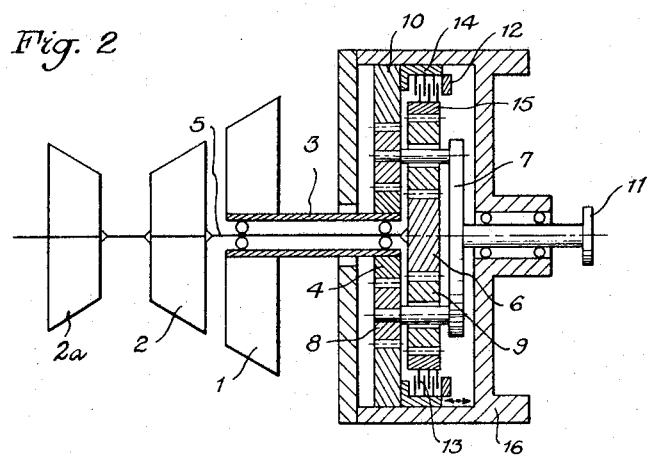
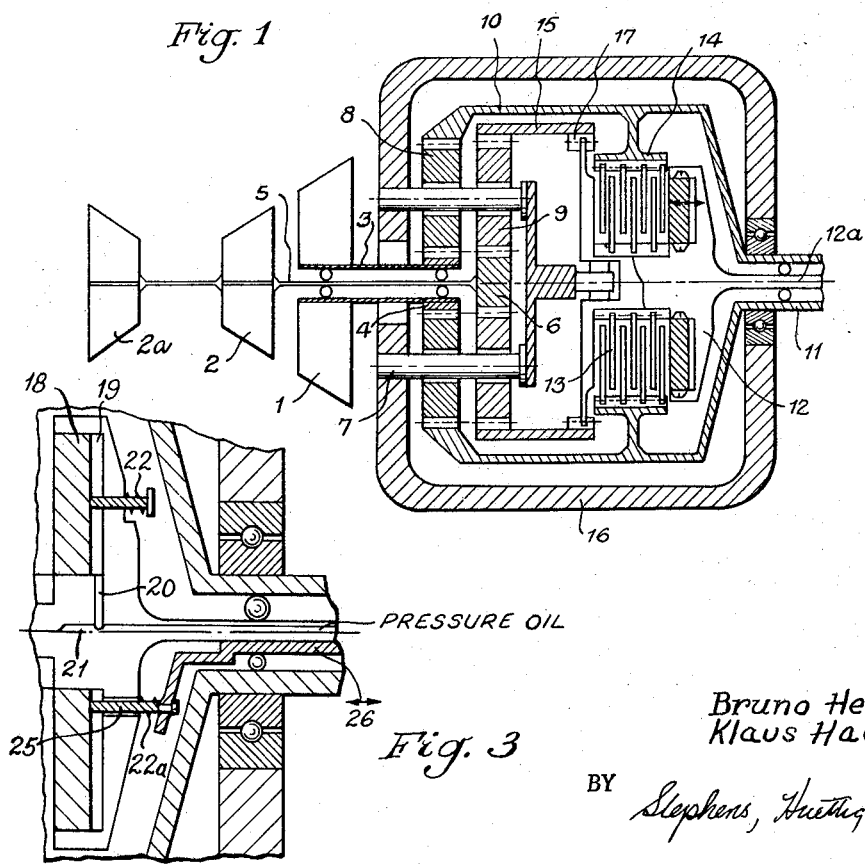
INVENTORS
Bruno Herrmann
Klaus Hagemeister
BY Stephens, Huettig and O'Connell
ATTORNEYS

United States Patent Office 3,507,113
Patented Apr. 21, 1970

3,507,113
DIFFERENTIAL GEAR FOR TWO-SHAFT GAS TURBINE
Bruno Herrmann, Bridgeport, Conn., and Klaus Hagemeister, Munich-Pasing, Germany, assignors to Motoren- und Turbinen-Union, Munich, Germany
Filed May 15, 1968, Ser. No. 729,302
Claims priority, application Germany, May 18, 1967, M 74,021
Int. Cl. F02c 7/02; F16h 37/06; B60k 3/04
U.S. Cl. 60—39.16                        9 Claims

ABSTRACT OF THE DISCLOSURE

A power gas turbine and a compressor gas turbine each coupled to a special gear set. The two gear sets can be clutched together so that under partial load or braking conditions power is transmitted from the power turbine to the compressor turbine or vice versa.

---

This invention relates to a gearbox between a free-power turbine and a compressor turbine of a two-shaft gas turbine engine with coaxial shafts. This gear ensures economic part load operation and enables a braking moment to be applied by the gas turbine, for example, during a downhill drive. Moreover, with this gear, a reduction of the output speed can be obtained.

Under part load conditions, the speed of the gas generator of a two-shaft gas turbine decreases; thus, in addition to the pressure ratio, also the turbine entry temperature decreases, resulting in a lower efficiency. This can be avoided by coupling the gas generator rotor to the power turbine through a gearbox. In the part load range, power is transferred from the compressor turbine to the power turbine through the gear; thus the flow can be considerably reduced while the temperature decreases only slightly which results in good part load efficiency.

Devices are known comprising an external auxiliary shaft with an intermediate clutch providing a connection between the power-turbine gear and an auxiliary gear coupled to the compressor turbine. The disadvantage of this arrangement is high complicity, since, under braking conditions, approximately nominal power must be transferred by way of the external auxiliary shaft and the auxiliary gear. Moreover, the lubrication system of the two separate gearboxes is complicated. Furthermore, the moment transferred constitutes an eccentric load acting upon the gas turbine casing making additional support necessary.

The object of this invention is to avoid these disadvantages and to provide an intermediate gearbox, suitable for vehicle gas turbine power plants, combining compactness with economic operation also in the part load range and permitting braking action.

This invention provides a differential gear having a first and a second gear wheel set, each set comprising a center inner gear, intermediate gears and an outer ring gear, said first gear wheel set being driven by the power turbine, and the second gear wheel set by the compressor turbine, and where under braking or part load conditions the power and compressor turbine are coupled together mechanically through a rigid connection of the two outer ring gears by means of a brake or clutch so that power turbine and compressor turbine rotate at a speed which depends upon the transmission ratios of said two gear sets.

Compared with known arrangements, the differential gear of this invention has the advantage of great compactness making it particularly suitable for vehicles. This high compactness is achieved by using simple and well-known machine elements so that considerable savings can be achieved. A great advantage is gained by using the intermediate gears, simultaneously, for reducing the output speed of the gas turbine. Another advantage is the fact that the two possible operating modes can be selected without difficulty.

The reduction gear for the two-shaft gas turbine of this invention is designed as a differential gear resembling a twin planetary unit with one carrier only. The power turbine drives one intermediate pinion set with the output being taken from the associated ring gear while stem means forming said carrier are stationary fixed in the casing. The second planet pinion set on said carrier is driven by the compressor turbine. Under full load conditions, the relevant ring gear is not torque loaded and rotates freely; under part load and braking conditions, the two ring gears are coupled to each other so that power is transmitted from the compressor turbine to the power turbine or vice versa. The transmission ratios of the two intermediate pinion sets are so selected that for a pre-determined part load point the speed ratio of compressor turbine and power turbine is such as to ensure maximum efficiency.

Another feature of this invention is the output ring gear forming a hollow cylinder containing the second intermediate pinion set and the associated ring gear and the clutch for the two ring gears. The diameter of the hollow cylinder is reduced to form a hollow shaft which houses the actuating mechanism for the clutch and an auxiliary output shaft connected to the second ring gear. This arrangement facilitates lubrication since the gear case presents no scaling problems.

In a second embodiment of this invention, the power turbine drives a carrier connected to the output shaft through a planet pinion set whereby the associated ring gear is rigidly mounted in the casing. Under part load and braking conditions, the ring gear coupled to the compressor turbine through the second planet pinion set is also positively connected to the case by said clutch, the load transmission between the two turbines being effected through the planet pinion carrier.

The means by which the objects of this invention are obtained are described more fully with reference to the accompanying schematic drawings, in which:

FIGURE 1 is a cross-sectional view through the gear box of this invention;

FIGURE 2 is a similar view of a modified form of the invention; and

FIGURE 3 is an enlarged detailed cross-sectional view of FIGURE 1 showing a hydraulic clutch above the center line, and a mechanical clutch below the center line, with an actuating mechanism positioned in a hollow shaft.

FIGURE 1 shows the power turbine 1 and the compressor turbine 2 driving the compressor 2a on shaft 5. The first gear set has a hollow output drive shaft 3 for power turbine 1 joined to an inner gear 4 for driving the intermediate pinions 8 which rotate on bearings carried by stationary stem 7 fixed to the housing or casing 16. The hollow cylinder output ring gear 10 terminates in a reduced diameter hollow output shaft 11.

The output ring gear 10 houses the second intermediate pinion set composed of pinions 9, and ring gear 15 as well as clutch 13 for the two rings gears 10, 15. The clutch 13 is optionally of mechanical or hydraulic design. In the hydraulic design a thrust plate 18 is used as a plunger. Oil under pressure enters the delivery chamber 19 from a pressure reservoir, not shown, through bores 20 and 21 via an actuating valve, not shown, which results in the thrust plate 18 connecting the clutch carriers 12 and 14 by pressure to each other. In the mechanical clutch, thrust rods 25 are securely connected to the thrust plate 18. Springs 22a arranged around the thrust rods serve the function of return springs. Pressure onto the clutch plates of the clutch 13 or release therefrom of the thrust plate 18 is carried out via a sliding sleeve 26, which is based on the shaft 12a and can be moved axially to and fro. The compressor turbine 2 drives the intermediate pinions 9 on stem 7 through shaft 5 rotating in bearings in the hollow shaft 3 and the sun gear 6 connected to shaft 5. The second ring gear 15 has internal teeth 17 meshed with the inner clutch carrier 12. Ring gear 15 is extended into an accessory drive shaft 12a coaxial with and within shaft 11. The ring gear 10 carries the outer clutch carrier 14.

Under full load conditions, clutch 13 is disengaged so that ring gear 15 rotates freely and no power transmission takes place between compressor and power turbine. For part load conditions or during a downhill drive, ring gears 10 and 15 will be positively coupled together through clutch 13 so that, under part load conditions, power is transferred to ring gear 10 from compressor turbine 2 through planet pinions 9. Under downhill driving conditions, the compressor on shaft 5 takes up braking power from ring gear 10 through clutch 13 and ring gear 15.

The modification in FIGURE 2 shows the power turbine 1, the compressor 2a and the compressor turbine 2. The planet pinions 8 are driven through hollow shaft 3 of power turbine 1 and sun gear 4 mounted on it. The ring gear 10 is mounted stationary in casing 16. The planet stem 7 is positively connected to output shaft 11 running in bearings in casing 16. The compressor turbine 2 drives the second planet set comprising the pinions 9 through shaft 5 running in bearings in hollow shaft 3 on which the sun gear 6 is mounted. The ring gear 15 forms the inner clutch carrier of clutch 13. The actuating mechanism 12 for clutch 13 is mounted in bearings in casing 16. The outer clutch carrier 14 is rigidly located in casing 16.

Under full load conditions clutch 13 is disengaged so that ring gear 15 can rotate freely. No mechanical connection exists between the two turbines 1 and 2 and therefore the output via the planet carrier 7 is through the power turbine 1 only. During downhill driving or under part load conditions, ring gear 15 is positively connected to outer clutch carrier 14 so that power turbine shaft 3 is mechanically coupled to compressor turbine shaft 5 through the two planet pinion sets. Thus power can be transmitted between the two turbine shafts 3 and 5.

Having now described the means by which the objects of the invention are obtained, we claim:

1. A gear box for coupling a power turbine driven shaft to a compressor turbine driven shaft comprising a casing (16), first and second gear wheels (4, 6) rotationally joined to their respective turbines, first and second ring gear wheels (10, 15), intermediate gear wheels (8, 9) coupling said ring gear wheels to said first and second gear wheels, stem means (7) for mounting said intermediate gear wheels in said casing, and clutch means (13, 14) having a first part joined to one ring gear wheel (10) and a second part joined to the other ring gear wheel (15) for connecting together the two ring gear wheels (10, 15) under braking or part load conditions for driving said power turbine driven shaft and said compressor turbine driven shaft at rotational speeds which are functions of the transmission ratios of the two gear wheel sets.

2. A gear box as in claim 1, the transmission ratios of said intermediate gear wheels being matched to ensure optimum efficiency for a predetermined part load.

3. A gear box as in claim 2, said gear box further functioning as a reduction gear for said turbine driven shaft.

4. A gear box as in claim 3 in which said stem means is stationary and fixed to said casing. (FIG. 1.)

5. A gear box as in claim 3 in which at least one ring gear wheel is fixed to said casing, and said stem means comprises a rotatable carrier rotatably supporting said intermediate gears.

6. A gear box as in claim 3, said compressor driven shaft (5) being rotatable within said turbine driven shaft (3).

7. A gear box as in claim 6, said ring gear (10) being cylindrical, and said ring gear (15) and said clutch means (13, 14) within said ring gear (10).

8. A gear box as in claim 7, said ring gear (10) terminating in a reduced diameter hollow output shaft (11), and an accessory drive shaft (12a) joined to said ring gear (15) and extending through said hollow shaft (11), and an actuating mechanism for clutch (13) extending through said hollow shaft (11) too.

9. A gear box as in claim 8, said clutch means comprising a mechanical or hydraulic clutch.

References Cited

UNITED STATES PATENTS

| | | | |
|---|---|---|---|
| 3,038,307 | 6/1962 | Oprecht | 60—39.16 |
| 3,287,903 | 11/1966 | Wickman | 60—39.16 |
| 3,313,104 | 4/1967 | Evans et al. | 60—39.16 |

OTHER REFERENCES

Wickman: German application 1,116,480, Nov. 2, 1961, W23521Ia A6f.

MARK NEWMAN, Primary Examiner

ALLAN D. HERRMANN, Assistant Examiner

U.S. Cl. X.R.

74—665, 675; 180—66